Sept. 6, 1932.  R. W. POWER  1,875,761
WORK SUPPORT FOR WELDING OPERATIONS
Filed May 29, 1930   2 Sheets-Sheet 1
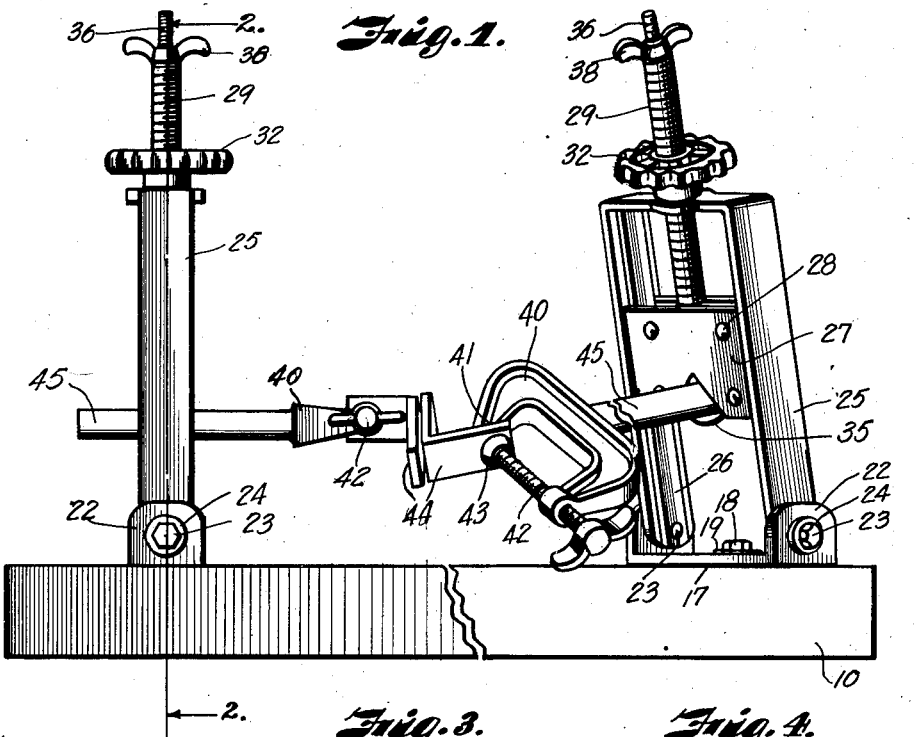
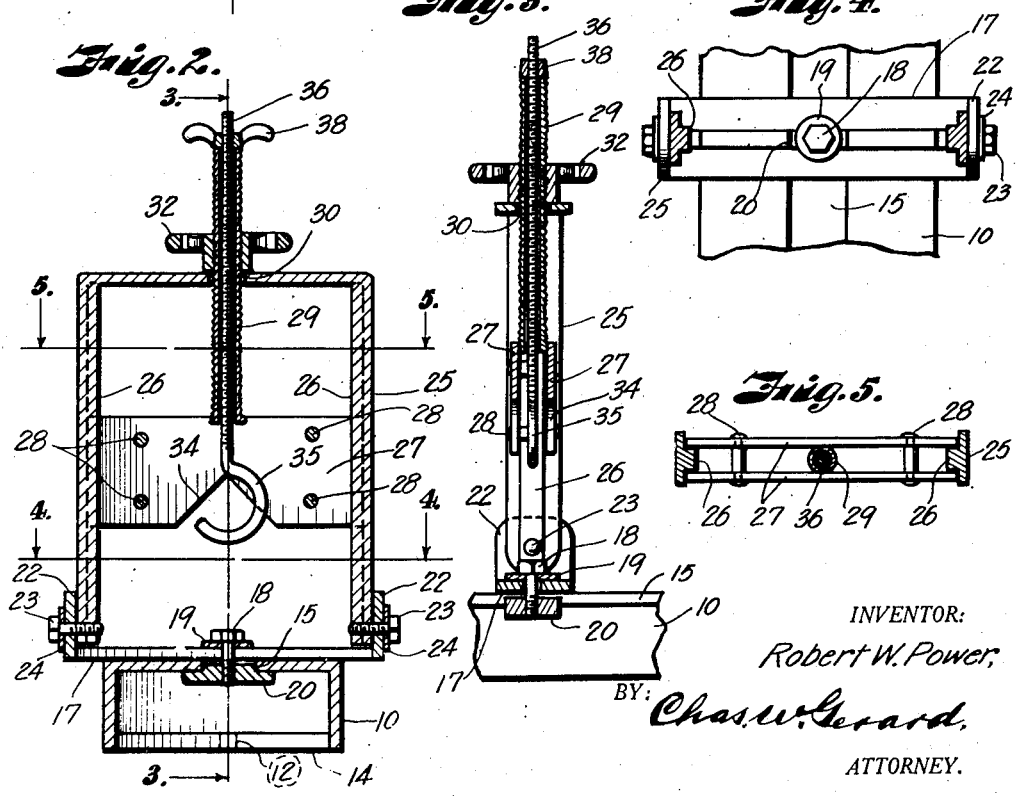
INVENTOR:
Robert W. Power,
BY Chas. W. Gerard,
ATTORNEY.

Sept. 6, 1932.           R. W. POWER           1,875,761
WORK SUPPORT FOR WELDING OPERATIONS
Filed May 29, 1930        2 Sheets-Sheet 2
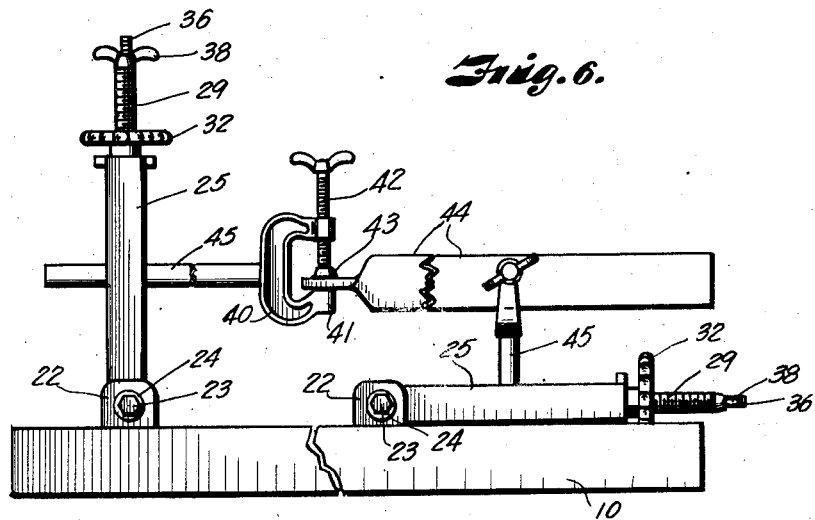
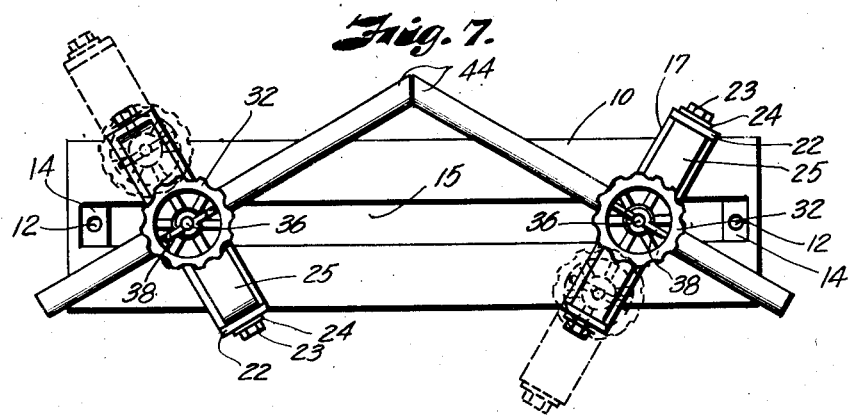
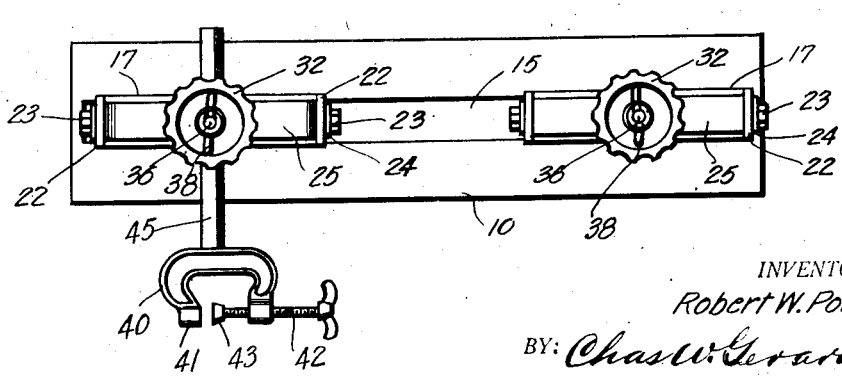
INVENTOR:
Robert W. Power,
BY: Chas W. Gerard
ATTORNEY.

Patented Sept. 6, 1932

1,875,761

UNITED STATES PATENT OFFICE

ROBERT W. POWER, OF SHUBERT, NEBRASKA

WORK SUPPORT FOR WELDING OPERATIONS

Application filed May 29, 1930. Serial No. 456,917.

The present invention relates to work-supporting or holding devices, and aims to provide an improved form of work-clamping and supporting means especially designed for use in welding operations.

The primary object of the invention therefore is to provide a novel and efficient form of work support of such a character as to provide conveniently adjustable means for clamping engagement with the work, in combination with other conveniently adjustable elements of construction whereby the work holding elements are rendered universally adjustable to the end that the parts being welded may be supported in any necessary relative position as required for the proper carrying out of the welding operation.

With this general object in view, the invention will now be described by reference to the accompanying drawings illustrating one practical and efficient form of construction for embodying the proposed features of improvement as well as various types of adjustment for which the same is adapted, after which those elements of construction and combinations deemed to be novel will be particularly set forth and claimed.

In the drawings—

Figure 1 is a side elevation illustrating a work support construction, embodying the present features of improvement;

Figure 2 is a vertical sectional view, representing a section taken on the line 2—2 of Figure 1;

Figures 3, 4 and 5 are detail sections, taken on the lines 3—3, 4—4 and 5—5, respectively, of Figure 2; and Figure 6 is a side view and Figures 7 and 8 plan views representing different positions of the work-holding and supporting members, and illustrating partially the range of adjustment of the same for meeting the requirements of different welding operations.

Referring now to the drawings in detail, the improved form of work support comprises a base member 10 of sufficiently heavy construction to provide a strong supporting bed, and may comprise a hollow casting with bolt openings 12 in the bottom transverse portions 14 thereof for convenience in attachment of the base member to a table or bench, if desired.

The base member 10 is provided with a longitudinal slot or guideway 15, designed to permit of the longitudinal adjustment of a pair of work holding or clamping devices, which are of identical construction, and a description of one only will suffice for both. The construction of each of said devices comprises a plate or bracket 17 the central portion of which is provided with a combined pivot and clamping bolt 18 fitted with a washer 19 and cooperating with an adjustable clamping block 20 into which the bolt 18 is threaded, the block 20 having a squared portion fitting the slot or guideway 15, and the marginal portions of the block engaging the side margins of the slot or guideway 15 within the base member 10, as represented in Figures 2 and 3.

The ends of the bracket 17 are formed with upright posts or lugs 22 for the pivotal mounting of clamp bolts 23 having washers 24, the inner ends of the bolts 23 being screwed into the lower ends of an adjustable U-shaped frame 25. The legs of the frame 25 are provided with a pair of guide plates 26 for the sliding adjustment of a work engaging and clamping member formed of a pair of plates 27 secured by rivets 28 or the like against the opposite side edges of the guide plate 26 (see Figure 5). The member 27 is supported and adjusted by means of an externally threaded sleeve 29 attached to the upper or outer margin of the member 27 and extending through an opening 30 in the middle portion of the frame 25 (Figures 2 and 3), against which middle or cross portion of the frame 25 is supported a hand wheel 32 threaded upon the sleeve 29 and thereby operating to adjust as well as to support the latter.

The member 27 is provided with an inverted V-shaped opening 34 with which cooperates for work engaging and clamping purposes the lower hook portion 35 of a screw 36 which is adjustable longitudinally through the sleeve 29, and supported by means of a thumb nut 38 threaded upon the screw 36 and in engagement with the outer end of the sleeve 29.

While certain kinds of work may be clamped by the hook member 35 cooperating with the V-shaped recess 34, as represented in Figure 7, for other kinds of work it is more convenient to employ the type of clamps illustrated in Figures 1, 6 and 8, each comprising a U-shaped frame 40 providing a fixed clamping jaw 41, and a screw 42 carrying a swiveled and adjustable clamping jaw 43 for suitable clamping engagement with the work, as indicated at 44 in Figure 1. Each of such frames 40 is provided with a fixed rod or shank portion 45 of any appropriate length adapted to be clamped by means of the elements 34—35 in suitably adjusted relation therewith.

By means of the foregoing construction, it will be obvious as illustrated by the drawings, that a universal adjustment is afforded the parts of the work by means of the character of the different adjustments of the various parts of the apparatus. For the bracket plate 27 may be adjusted longitudinally into any position along the slot or guideway 15 as well as set at any desired angle with reference to the axes of the bolts 18 before these are clamped for fixing the adjustment by means of the block 15. Besides these longitudinal and angular adjustments, the frames 25 are also adjustable about the axes of the bolts 23 by loosening and tightening these bolts, and thus tilting the frames, with the parts of the work carried thereby, to any desired angles with reference to the horizontal. By loosening the nuts 38, the work may be adjusted with reference to these frames by shifting the rod or shank portions 45 of the holder clamps 40, either longitudinally or rotatively, relatively to the frame members 27 by loosening the nuts 38, and after these are tightened the work may be further adjusted vertically (or longitudinally of the frames 25) by operation of the wheels 32 for raising and lowering the members 27.

In the most of the apparatus made use of in small shops, such as in small villages where farm equipment is brought in for repairs, there is considerable difficulty experienced in properly lining up the parts which are to be welded, which is ordinarily done by blocking them up with fire clay in position for the action of the blow torch. This means that the parts to be welded are not only difficult to adjust into their exact position of alinement, but they also give no end of trouble in maintaining them in this proper relationship. This is especially true with small parts, since these are particularly troublesome to manipulate, and to hold in place during the welding process, as well as in the adjustment of the position of the parts as required for the different stages of the welding process. The difficulties thus experienced are all the more apparent when it is considered that there are temperature changes involved, due to the expansive action of the heat, during the intense heat developed in the application of the welding torch, thereby producing material variations at the points or surfaces being welded, as well as in the material used for blocking up the parts of the work. Moreover, besides the time and trouble involved in such operations, there is also a material amount of waste incurred, due to the fact that a large proportion of the heat of the welding process is not absorbed directly by the parts being welded, but is dispersed into the surrounding material used for supporting those parts in position; and the waste of the gas supply is a point to be particularly regarded under circumstances where such supply is required to be brought in tanks from a considerable distance.

By the present improved apparatus, much of this difficulty is overcome, and likewise a saving effected as regards economy of time, labor and minimizing the volume of gas consumed. It will be apparent that there is no guess work involved in the alinement of the parts of the work, indicated at 44, in the true and correct relation, preparatory to the action of the welding flame.

Moreover, this position is susceptible of the finest adjustment necessary for effecting such alinement, and the parts are thereafter held rigidly in this correct relation until the process is completed. The operations involved on the part of the shopman are also of an extremely simple nature, easy to carry out, and with a minimum of time and effort.

In the position of adjustment illustrated in Figure 1, it will be noted that the left hand supporting frame 25 is left an upright or vertical position, with the work clamping frame 40 carried thereby at the proper height, while the other supporting frame 25 is tilted slightly about the axes of the bolts 23, and the bracket 22 rotatively adjusted about the axis of its bolt 18; thereafter, by adjustment of the hand wheel 32 the proper elevation of the parts 44 of the work is obtained to bring them in correct alinement.

The views illustrated in Figures 6, 7 and 8 show other methods whereby the apparatus may be manipulated to meet the requirements of any particular character of the work and the position they must assume to aline the fractured surfaces properly for the process. In Figure 6, the left hand frame 25 is left upright the same as in Figure 1, while the other frame 25 may be swung into horizontal position with the clamping member in upright position, thus accommodating any lineal dimension of the part 44 which may be involved.

In Figure 7, the frame members 25 are set at angles to the base member 10 for supporting the parts of the work 44 in such a position as to match their beveled ends in proper flush relation, as indicated. The broken lines in this view merely represent the capacity for adjustment of the frame members 25 transversely with reference to the guideway 15, for increasing the range of adjustment laterally, as conditions may require.

In Figure 8 is illustrated a position in which the frame members 25 may be brought into substantially the same plane, in practical alinement with the guideway 15, in which position the work may be held at either side of the base member 10, thus taking care of practically any size of parts to be welded, regardless of their longitudinal extent, since both sides of the device are left free for this purpose.

In such operations, either one or both of the clamping devices 40—45 may be employed, as may be necessary.

An advantage of the hook form of clamping element 35 resides in the fact that the member 45, or the work itself (as illustrated in Figure 7) may be slipped sideways into position within the hook 35, without requiring it to be brought in endwise.

One feature of adjustment possible with the improved form of apparatus lies in the fact that a cardboard form of pattern may be cut, preliminary to the adjustment of the parts, representing the angle at which the parts are to be welded, after which such cardboard pattern may be employed as a templet for engagement with the parts and thereby alining them together at that angle.

It will therefore be apparent that a practical and efficient apparatus, with wide range of adjustment, has been devised for fulfilling the desired objects of my invention. A great saving in the amount of gas, heretofore wasted, is also brought about by the fact that the heat applied by the action of the torch is confined directly to the welding zone, and not wasted in surrounding material used for blocking up the parts; nor is there any danger of the parts of the fracture becoming displaced due to the heat of expansion, since they are clamped rigidly in position and maintained so throughout the process.

While I have illustrated and described what I now regard as the preferred form of construction for embodying my improvement, it is to be understood that this form is merely illustrative, and I desire expressly to reserve the right to make any and all changes which may fairly fall within the scope of the appended claims.

What I claim is:

1. In a work support, a frame member, a work-clamping element mounted for adjusting movement within the frame, a threaded sleeve attached to said clamping element and provided with an adjusting wheel supported by said frame, and a second clamping element carried by a screw rod extending through said sleeve and provided with an operating nut engaged by one end of said sleeve.

2. A work support for welding operations comprising a base member provided with a longitudinal slot, a flat bracket member resting upon said base member and formed with a slot, a bolt extending through the slot of said base member as well as the slot of said base portion and provided with a clamping nut, whereby said bracket member is adjustable both longitudinally and transversely of said base member as well as angularly about the axis of said bolt, a pivotally adjustable frame member mounted upon said bracket member, and work clamping means carried by said frame.

3. A work support for welding operations comprising a base member provided with a longitudinal slot, a pair of bracket structures each provided with a pivotally adjustable frame member and having a flat base portion resting upon said base member and formed with a slot, work-clamping means carried by each of said frame members, and a pair of independently adjustable clamping bolts extending through the slots of said base member and the respective slots of said flat base portions, whereby said bracket structures are independently adjustable both longitudinally and transversely of said base member as well as angularly about the axes of said bolts for cooperatively clamping the work by means of said work-clamping means.

In witness whereof I hereunto affix my signature.

ROBERT W. POWER.